INVENTOR.
GEORGE F. WIKLE

July 25, 1939.  G. F. WIKLE  2,167,017
APPARATUS FOR SLITTING TIRE TREADS
Filed July 15, 1936  4 Sheets-Sheet 4

INVENTOR.
GEORGE F. WIKLE
BY
ATTORNEY

Patented July 25, 1939

2,167,017

UNITED STATES PATENT OFFICE 2,167,017

APPARATUS FOR SLITTING TIRE TREADS

George F. Wikle, Detroit, Mich., assignor, by mesne assignments, to United States Rubber Company, New York, N. Y., a corporation of New Jersey Application July 15, 1936, Serial No. 90,716

12 Claims. (Cl. 164—61)

This invention relates to tire manufacturing apparatus, and in particular it relates to an apparatus for slitting the treads of pneumatic tires.

For the purpose of improving the antiskid qualities and increasing the wearing qualities of pneumatic tires, it has been found desirable to make small transverse slits in the tread faces of such tires without substantially removing any rubber from the tread faces of the tires while providing such slits.

I have provided apparatus for applying such slits to pneumatic tire treads which is automatic for a considerable part of its operation, in which it is easy to mount and dismount a tire, in which the depths of the slits may be made uniform or of variable depths in a single continuous cutting operation, in which the slits may be spaced at regular or variable intervals circumferentially of the tire, and which apparatus is adjustable for different sizes of tires.

The accompanying drawings illustrate a present preferred embodiment of my invention, in which—

Figure 1:
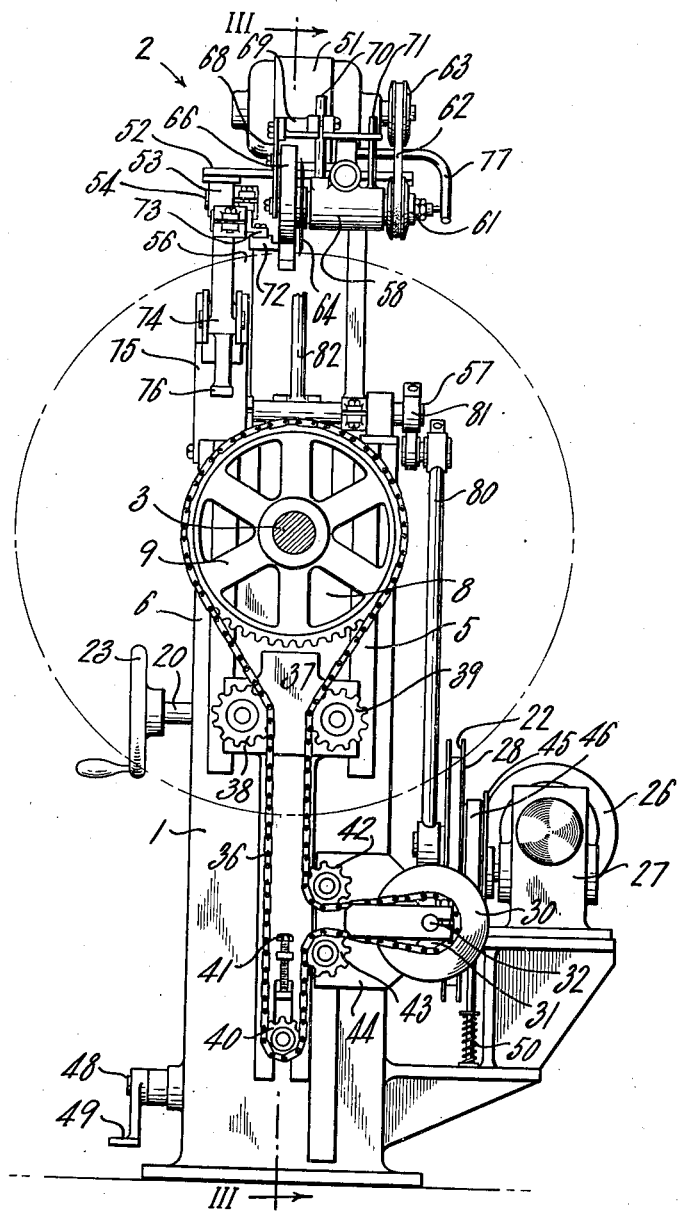
Fig. 1 is a front elevational view of a tread slitting apparatus embodying my invention.

Referring to the drawings, I show a tread slitting apparatus comprising, in general, a base or frame 1 supporting a cutting unit 2 which, through a reciprocal movement, produces cuts or incisions in treads of tires mounted on the frame therebeneath on a shaft 3 and a supporting chuck 4.

Figure 3:
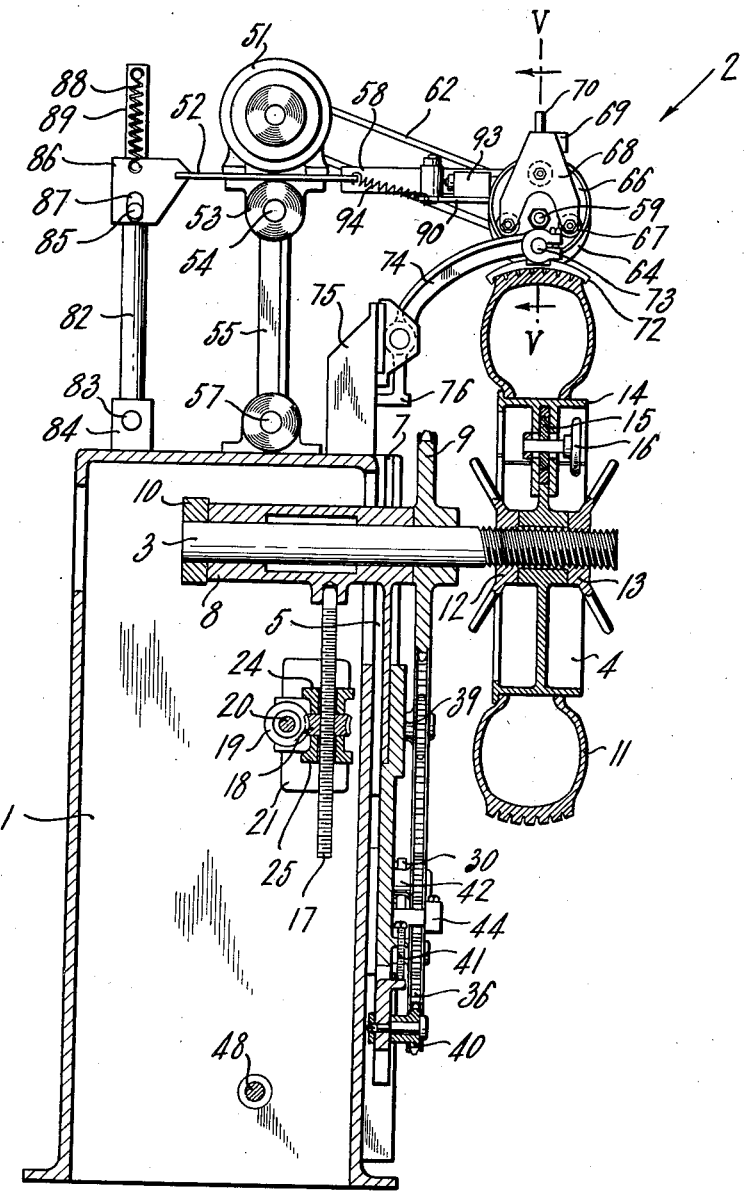
Fig. 3 is a sectional view, in part, taken along section line III—III of Fig. 1.

Attached to the base 1, and on the front surface thereof, are two surface brackets 5 and 6 (Fig. 1), each bracket having a vertical slot 7 (Fig. 3) cut into its marginal portion and forming a slide for a bearing block 8. The shaft 3 is free to revolve in the bearing block 8, and has attached thereto a sprocket 9 and a retaining collar 10. Located on the front end of the shaft 3 is the expansible chuck 4 on which is mounted a tire 11. The shaft 3 is threaded at the chuck end and engages with retaining nuts 12 and 13 for positioning the chuck 4 in a central location when used with different sizes of tires. A collapsible segment 14, forming part of the chuck 4, is attached thereto by a cam 15 operable by a hand wheel 16 (Fig. 3) for lowering the segment 14 when mounting and dismounting the tire, and expanding it to hold the tire in position during the slitting operation.

To slit tires of varied diameters, I provide means for raising or lowering the tire relative to the cutting unit. This is accomplished by elevating or lowering the bearing block 8 in the brackets 5 and 6 (Fig. 1). Attached to the bearing block 8 (Fig. 3) is a vertical shaft 17. In threaded engagement with this shaft is a worm gear 18 which meshes with a worm 19 mounted on a shaft 20. The shaft 20 is supported at each end by a bearing 21 attached to the frame 1. A hand wheel 23, fastened to one end of the shaft 20, provides manual means for rotating the worm gear 18 and adjusting the vertical position of the tire. The worm gear 18 is restrained from moving vertically by stationary arms 24 and 25 projecting from sides of the frame 1.

Figures 6, 7:
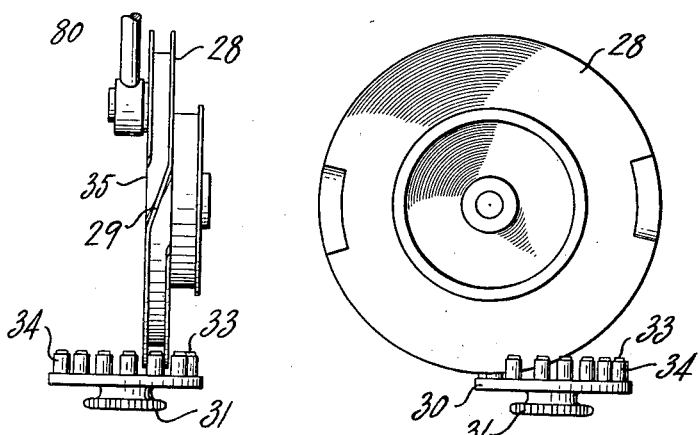
Fig. 6 is a plan view of cam means for driving a tire in an intermittent movement.
Fig. 7 is an end elevational view thereof.

During the operation of slitting, the tire is intermittently rotated in one direction to space the slits or incisions around the crown portion of the tire. To initiate this movement, I provide a motor 26 (Fig. 1) driving through a reduction unit 27, and a cam wheel 28 (Figs. 6 and 7) having flanged margins forming a groove 22 circumferentially of the wheel. The continuity of the groove 22 is broken at one or more places where the flanged margins cross over to join with the flange transversely opposite. In this manner a wall 29 is formed in spiral formation across the path of the groove 22. The wall 29 functions as a cam for driving the tire intermittently as hereinafter described.

At right angles to the flange wheel 28 is a disc 30 to which is attached a sprocket 31 supported on a shaft 32. Spaced around the face of the disc 30 are a plurality of bearing pins 33 on which are mounted rollers 34. The disc 30 is so positioned in relation to the cam wheel 28 that one of the rollers 34 lies within the groove 22 of the wheel 28 until such time as the wheel 28 makes a one-half revolution. At this point a wall 29 contacts the roller 33, causing partial rotation of the disc 30 and moving the roller toward an opening 35 through which the roller moves out of the path formed by the groove 22. The following roller is simultaneously brought into position between the flanges. As one roller moves out of engagement with the cam wheel 28 another roller moves into its path, thus driving the disc 30 in an intermittent motion. A continuous cycle of such operations eventually completes one revolution of the tire 11.

It is sometimes desirable to have the slits in the tire irregularly spaced circumferentially. To attain this result I position the rollers 34 around the disc 30 to correspond with the spacing desired in the finished article; i. e., regularly, irregularly, or in any desired sequence of spacing.

The tire is rotated in an intermittent motion through a chain 36 connected between the sprockets 31 and 9. Fastened to the sliding plate on the bearing block 8 is a bracket 37 on which are mounted idler sprockets 38 and 39 and a chain tightening sprocket 40. The latter sprocket is adjustable by means of a screw 41. The chain 36 also runs on two other idler sprockets 42 and 43 mounted on a bracket 44 which supports a shaft 32. By this arrangement of sprockets a permanent driving connection may be maintained between the shaft 3 and the disc 30, notwithstanding variations in the vertical adjustment of the shaft 3.

The slitting operation is performed when the tire is at rest between the periods of intermittent motion. The cutting unit 2 moves transversely of the crown of the tire 11, cutting a transverse slit or incision in the tread. The cutting unit remains in its forward position until the tire has moved forward the distance permitted it by the spacing of the rollers 34 in the disc 30, and then cuts a similar slit on the return of the unit to its original position.

Figure 2:
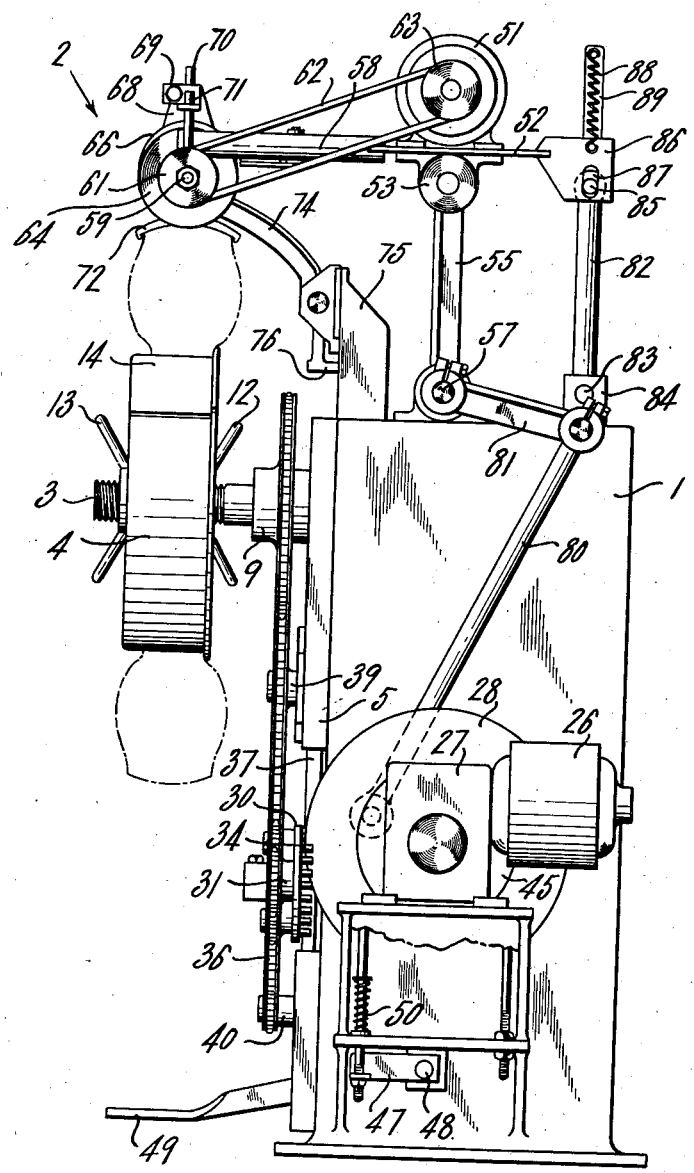
Fig. 2 is a side elevational view thereof.

Associated with the cam wheel 28 is a brake drum 45 (Figs. 1 and 2) on which is mounted a brake of conventional type, consisting of a brake band 46 rigidly attached at one end and actuated at the other by a lever 47 connected to a shaft 48 which is associated with a foot lever 49, operating against a spring 50, controlled by the operator when it is desired to stop the machine after completing a cycle of operation.

The cutting unit 2 includes a motor 51 (Fig. 2) mounted on a base plate 52 on the under side of which are located bearings 53 supporting a shaft 54. From shaft 54 supporting arms 55 and 56 extend and are secured to a pivotal pin 57.

Figure 5:
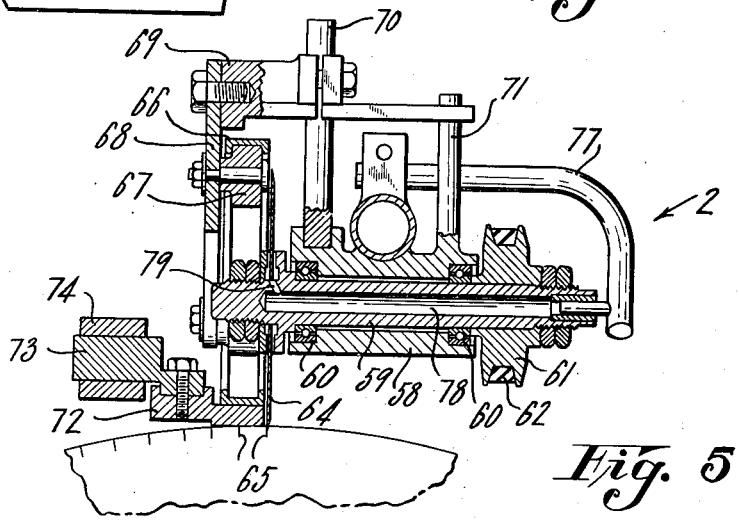
Fig. 5 is a sectional view, in part, of the cutting unit, taken along section line V—V of Fig. 3.

Rigidly connected to the plate 52 is a housing 58 of T shape in the cross end of which is located a spindle 59 supported in bearings 60 (Fig. 5). Mounted on one end of the spindle 59 is a pulley 61 driven through a belt 62 from a pulley 63 attached to the motor 51. Mounted on the opposite end of the spindle 59 is a circular knife 64. This knife produces the cuts or incisions 65 in the tire tread.

To control the depth which the knife will cut, I provide a guide wheel 66 supported on rollers 67 mounted on a bracket 68 attached to a clamp 69. The depth of the cut is governed by the position of the clamp 69 on the guide pins 70 and 71 carried by the housing 58.

It has been found desirable to have the slits vary in depth as they extend transversely of the crown of the tire. For instance, it is preferable that the depth of the slit at the edges be about twice the depth at the crown portion. To attain this result I provide a template 72 attached to a retaining member 73 clamped in an arm 74 which is hinged to a supporting member 75 fastened to the base 1. The template 72 is of such shape that the inner surface will conform to the contour of the tire. The thickness is such that when the guide wheel 66 contacts and rides across its surface, the knife 64 will follow a desired path across the crown of the tire to control the depth of the slit. As shown, the template 72 is thicker at the center than at the edges so that the slit is deeper at the shoulders of the tire than at the crown.

When mounting the tire, the arm 74 is thrown back and out of the way while the tire is placed in the chuck 4 after which it is brought down into place against the tire where it is located and held in position against a stop 76.

To facilitate the cutting of the rubber tread I preferably employ a water lubricant. Coming from a source of supply (not shown) the water passes through a fixed pipe 77 (Fig. 5) which has a nipple entering the end of the spindle 59 and about which the spindle rotates. The water passes through a cavity 78 to an outlet 79 and thence through grooves in the knife clamping face of the spindle to the cutting edge of the knife. During the cutting operation a quantity of water is thrown out along the surface of the cutter blade, thereby insuring adequate lubrication.

The reciprocating movement of the cutting unit 2 is supplied by a connecting rod 80 (Fig. 2) eccentrically mounted on the flanged wheel 28 and connected to the pin 57 by means of a lever arm 81. The lever arm 81 is secured to the pin 57, thus movement of the lever 81 transmits rocking motion to the arms 55 and 56 to carry the cutting unit transversely of the crown of the tire 11. After the tread of the tire is properly slit, the tire rotates forward in an intermittent motion as determined by the cam 28 and the spacing of the rollers 34, and as it comes to rest a subsequent slit is cut into the tread during the return reciprocal movement of the cutting unit. The reciprocating movement of the cutting unit 2 continues automatically until the tire tread is completely slit.

To maintain the cutting unit in contact with the tire, and to limit its vertical movement, I provide a tension device which comprises an arm 82 free to pivot on a shaft 83 supported in a bearing 84 attached to the base 1. A pin 85 projecting laterally from the arm 82 engages with a block 86 secured to the motor base plate 52. Slots 87 in the block, and with which the pin 85 engages, limit the vertical movement of the cutting unit. Attached to the block 86 are tension springs 88, one end of which is attached to an extension member 89 on the arm 82. As the arms 55 and 56 turn about the pin 57 under the oscillating action of the lever 81, the arm 82 turns on its shaft 83 and remains parallel therewith. The block 86 has slight movement on the arm 82 by reason of its engagement with the plate 52, but the latter turns on its shaft 54, thereby causing the cutting unit 2 to bear against the tire 11 by the action of the springs 88. The length of slots 87 is such that the pins 85 engage the bottoms thereof and produce a slight lifting action of the cutting unit 2 when the arm 82 is in the extreme right hand position, as viewed in Fig. 2, thereby compensating for the loss of elevation of the plate 52 due to the angular position of the arms 55 and 56. At other times the springs 88 control the position of the cutting unit.

Figure 4:
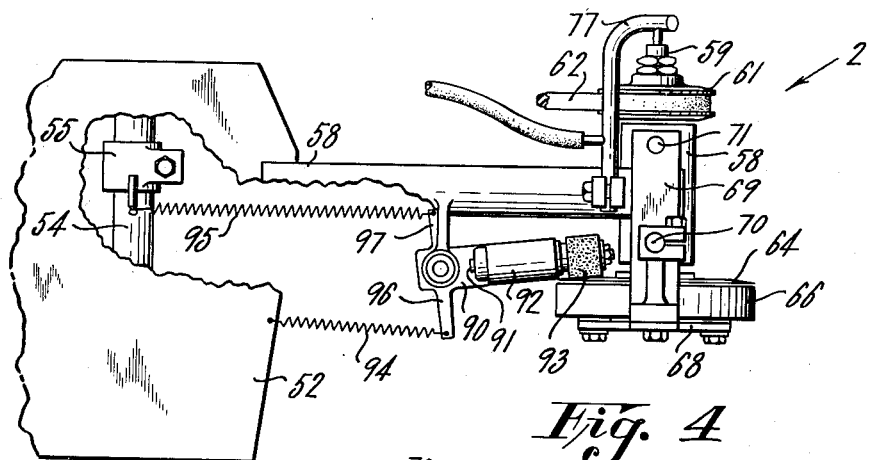
Fig. 4 is a plan view of a portion of the cutting unit.

In Fig. 4 I have illustrated a device for sharpening the cutting knife when in operation, thus eliminating the necessity for removing the knife. The assembly consists of a supporting bracket 90 pivoted in a bearing which projects from the housing 58, a spindle 91 running in a bearing 92 which is mounted on the supporting bracket 90, and an abrasive wheel 93 which is secured to one end of the spindle 92. The periphery of the abrasive wheel 93 is positioned to contact the beveled surface of the cutting knife, but is at a slight angle thereto to provide a grinding action.

To prevent a constant grinding action, I employ two springs 94 and 95 fastened at one end to projecting arms 96 and 97, respectively, extending from the supporting bracket 90. The opposite ends of the springs 94 and 95 are attached to the base plate 52 and to the supporting arm 55, respectively. When the cutting unit 2 is in the back position, or to the left in Fig. 2, the tension of the spring 94 overcomes the pull of spring 95, thus bringing the grinding wheel 93 in contact with the knife. As the cutting unit moves to the forward position, or to the right in Fig. 2, the tension of spring 95 increases, by reason of the turning of the arm 55 relative to the shaft 54 and the plate 52, and overcomes the pull of the spring 94 removing the grinding wheel 93 from the knife, thus providing an intermittent sharpening operation.

In the operation of the apparatus, the tire 11 is manually positioned on the chuck 4 and secured thereon by the adjustable segment 14 being moved in tight engagement with the tire by means of the cam operated hand wheel 16. In order to position the tire in a plane directly below the cutting unit, the hand operated retaining nuts 12 and 13 may be adjusted to move the chuck 4 axially of the shaft 7.

It is also necessary to adjust the tire vertically so that its uppermost tread portion will engage with the track template 72. This template rests upon the surface of the tire tread and determines the depth that the cutting knife 64 will extend into the tread and its tread surface may conform generally to the profile of the tread to form a track surface over which the cutting unit rides, or it may have a curvature differing from the curvature of the profile of the tire. The shape of the template determines the depth of the slit and it may be varied at different portions of the tire tread.

When the tire is properly positioned, the motor 51 is set into operation, running continuously throughout the operation of the machine.

The motor 26 is next set into operation, and the cutting unit is reciprocated over the crown of the tire, making a cut or incision in both its forward and backward stroke. The motor 26 also rotates the tire in an intermittent motion at periods when the cutting unit is not in engagement with the tire. This operation is continued until the transverse cuts are properly spaced throughout the entire circumference of the tire. When the last cut is made, the operator shuts off the motor 26 and presses the brake pedal 49 to prevent further reciprocal movement of the cutting unit. The cutting knife is sharpened during its reciprocations.

The operator then moves the hand wheel 16 to collapse the segment 14 and remove the tire from the chuck. Thereafter another tire may be placed on the chuck and the machine set into operation in a similar cycle.

While I have shown and described certain preferred embodiments of my invention, it is to be understood that modifications may be made therein, within the spirit of the invention and the scope of the appended claims.

Having thus described my invention, what I claim and desire to protect by Letters Patent is:

1. An apparatus for slitting treads of pneumatic tires comprising means for rotatably supporting a tire, driving means for intermittently imparting increments of rotary motion to the supporting means, a guide track adapted to rest upon the tread of the tire, a rotary circular knife, means for actuating the knife, and means for moving the knife transversely of the tread of the tire while supported at least in part by the guide track.

2. An apparatus for slitting treads of pneumatic tires comprising means for axially supporting a tire, driving means for intermittently imparting increments of rotary motion to the supporting means, a guide track having a surface conforming with the transverse profile of the tread and adapted to rest thereon and having a second surface of different curvature than the profile of the tread, a rotary circular knife, means for actuating the knife, and means for moving the knife transversely of the tread of the tire while following the path defined by the said second surface of the guide track.

3. An apparatus for slitting treads of pneumatic tires comprising means for rotatably supporting a tire, driving means for intermittently imparting motion to the supporting means, a guide track adapted to rest upon the tread of the tire, a rotary knife, means for adjusting the axis of the supporting means vertically for moving a tire mounted thereon into cooperative position with the guide track, and means for moving the knife transversely of the tread of the tire in a path determined by the guide track.

4. An apparatus for slitting treads of pneumatic tires comprising means for rotatably supporting a tire, driving means for imparting intermittent motion to the supporting means, a guide track having a surface conforming to the transverse profile of the tread and adapted to rest thereon and having a second surface of a curvature formed by a shorter radius than the curvature of the profile of the tread, a rotary knife, actuating means for the knife, and means for reciprocating the knife transversely of the tread of the tire in a direction determined by said second surface of the guide track.

5. An apparatus for slitting treads of pneumatic tires comprising an axle for rotatably supporting a tire, driving means for intermittently imparting increments of rotary motion to the axle, a guide track adapted to rest upon the tread of a tire mounted on said axle, a cutting knife supported in a position to engage said tire and follow the guide track, and means for moving the knife transversely of the tread of the tire while following the path defined by said guide track.

6. An apparatus for slitting tire treads comprising means for rotatably supporting a tire, means for intermittently applying increments of rotary motion to said supporting means, a guide track for engaging a tire tread when mounted on said supporting means, a pivotal support for said guide track to permit the guide track to move out of the way of the tire during the mounting and dismounting of the tire, a cutting knife, means for supporting the cutting knife in cooperative relation to the guide track, means for moving the knife transversely of the tire tread, and means for synchronizing the movement of the tire supporting means and the knife moving means so that the knife is moved transversely of the tire tread during periods of dwell of the tire supporting means.

7. In an apparatus for slitting tire treads, a base, means for rotatably supporting a tire on said base, a knife for cutting slits in a tire mounted on said supporting means during relative transverse movements, means for supporting said knife comprising a transversely extending arm to an end of which the knife is secured and parallel members having pivotal connections to the other end of the arm and having pivotal connections to the base, means for imparting a rocking motion to said members to move said knife transversely of said tire, and resilient means associated with one of said members for compensating for potential changes in the elevation of said knife during the rocking of said members.

8. In an apparatus for slitting the tread of a tire, a guide track adapted to bear against the tread of a tire mounted therein, a circular cutting knife, means for rotating the knife, means for moving the knife transversely of the tire tread, and a rotatable member encircling the axis of the cutter but having an eccentric mounting for engaging the guide track and limiting the projection of the cutter beyond said guide track for determining the depth of the slit made by the cutter in said tire.

9. An apparatus for slitting treads of pneumatic tires comprising a knife, means for reciprocating the knife, a chuck for supporting a tire in a position to be engaged by the knife during its to and fro movements, a base for supporting the knife and the chuck, means for intermittently imparting increments of turning movement to the chuck and means for adjusting the position of the chuck on the base relative to the knife to permit the slitting of different sizes of tires without disassembly of the component parts of the apparatus, said means comprising a plate movable in a guideway in the base, a screw, and means for cooperating with the threads on said screw for raising and lowering the axis of said chuck.

10. In an apparatus for slitting treads of pneumatic tires, means for rotatably supporting a tire having a tread surface curved in transverse cross-section, a cutting knife, means for moving the knife across the tread of a tire mounted on said supporting means and in an arcuate path having a predetermined relation to the curvature of the tread surface, a driving motor, and means connecting between the motor and the tire supporting means for imparting varying increments of motion to the tire supporting means between different movements of the knife.

11. An apparatus for slitting treads of pneumatic tires comprising means for rotatably supporting a tire, driving means for intermittently imparting increments of rotary motion to the supporting means, a guide track shaped to conform to the tread of the tire and in cooperative relation thereto, a rotary circular knife, means for actuating the knife, and means for moving the knife transversely of the tread of the tire while supported at least in part by the guide track.

12. An apparatus for slitting treads of pneumatic tires comprising means for rotatably supporting a tire, driving means for intermittently imparting increments of rotary motion to the supporting means, a guide track shaped to conform to the tread of the tire and in cooperative relation thereto, a cutting knife, means for actuating the knife, and means for moving the knife transversely of the tread of the tire while supported at least in part by the guide track.

GEORGE F. WIKLE.